US006978420B2

(12) United States Patent　　(10) Patent No.: US 6,978,420 B2
Ching　　　　　　　　　　　　　　　　(45) Date of Patent: Dec. 20, 2005

(54) HIERARCHICAL DOCUMENT CROSS-REFERENCE SYSTEM AND METHOD

(75) Inventor: Philip Waisin Ching, Gaithersburg, MD (US)

(73) Assignee: Aplix Research, Inc., Gaithersburg, MD (US)

( * ) Notice: Subject to any disclaimer, the term of this patent is extended or adjusted under 35 U.S.C. 154(b) by 809 days.

(21) Appl. No.: 09/781,685

(22) Filed: Feb. 12, 2001

(65) Prior Publication Data

US 2002/0111968 A1　　Aug. 15, 2002

(51) Int. Cl.$^7$ ............................................ G06F 17/00
(52) U.S. Cl. ...................... 715/511; 715/526
(58) Field of Search .................. 715/511, 513, 526, 715/531, 530; 707/3

(56) References Cited

U.S. PATENT DOCUMENTS

| | | | |
|---|---|---|---|
| 4,827,330 A | 5/1989 | Walsh et al. | |
| 5,142,619 A | 8/1992 | Webster, III | |
| RE35,861 E | 7/1998 | Queen | |
| 5,819,300 A | 10/1998 | Kohno et al. | |
| 5,956,726 A | 9/1999 | Aoyama et al. | |
| 6,038,561 A * | 3/2000 | Snyder et al. | 707/6 |
| 6,064,968 A * | 5/2000 | Schanz | 705/1 |
| 6,366,933 B1 | 4/2002 | Ball et al. | |
| 6,438,566 B1 * | 8/2002 | Okuno et al. | 715/512 |
| 6,449,624 B1 * | 9/2002 | Hammack et al. | 707/203 |
| 6,560,620 B1 | 5/2003 | Ching | |
| 6,658,626 B1 * | 12/2003 | Aiken | 715/526 |
| 2002/0116399 A1 * | 8/2002 | Camps et al. | 707/200 |

OTHER PUBLICATIONS

Douglis et al., "Tracking and Viewing Changes on the Web", USENIX Technical Conference, 1996, pp. 1-13.*

(Continued)

Primary Examiner—Stephen Hong
Assistant Examiner—Adam M. Queler
(74) Attorney, Agent, or Firm—Knobbe Martens Olson & Bear LLP

(57) ABSTRACT

A hierarchical document cross-reference system comprises a document server computer remotely accessible by a user computer. The document server computer includes a database which stores the contents of a first document and a second document. The first document contains one or more segments and the second document contains one or more segments. Each segment is identified by a segment identifier. The document server computer also includes a module executable in the document server computer. The module is configured to receive a request to cross-reference the first document and the second document on a key phrase. The module searches the first document and the second document for the key phrase and identifies the segments in the documents containing the key phrase. The module then displays on the user computer a side-by-side display listing the segment identifiers for the identified segments. The segment identifiers for the identified segments in the first document containing the key phrase are displayed in a first list and the segment identifiers for the identified segments in the second document containing the key phrase are displayed in a second list. The user can subsequently select a segment identifier from each list and submit the segment identifiers for display. The module then displays the contents of each segment, with the key phrase highlighted in a distinct color or by other means.

30 Claims, 9 Drawing Sheets

OTHER PUBLICATIONS

Wang et al., "Structural Matching and Discovery in Document Databases", Proceedings of the 1997 ACM SIGMOD Internation conference on Management of Data, Arizona, US, 1997, pp. 560-563.*
Ching, "A White Paper on Dynamic Program Management Aid (DPMA)" Jan. 2000, http://www.aplixsearch.com/whitepaper.html.*
Philip Ching, Aplix Agenda 1, published Jun. 5, 2003, U.S.A.
Philip Ching, Aplix Agenda 2, published Mar. 15, 2004, U.S.A.
Philip Ching, Aplix Agenda 3, published Mar. 18, 2005, U.S.A.
Philip Ching, Aplix Brochure 1, published Nov. 2003, U.S.A.
Philip Ching, Aplix Brochure 2, published Jan. 2004, U.S.A.
Philip Ching, Aplix Brochure 3, published 2003, U.S.A.
Philip Ching, Aplix Brochure 4, published Sep. 2003, U.S.A.
Philip Ching, Aplix Brochure 5, published 2002, U.S.A.
Philip Ching, Aplix Brochure 6, published 2004, U.S.A.
Philip Ching, Aplix Brochure 7, published 2005, U.S.A.
Philip Ching, aplixsearch.com website, version 1, published approx. Oct. 2000, worldwide.
Philip Ching, aplixsearch.com website, version 2, published approx. Nov. 2001, worldwide.
Philip Ching, aplixsearch.com website, version 3, published approx. Feb. 2002, worldwide.
Philip Ching, aplixsearch.com website, version 4, published approx. Feb. 2002, worldwide.
Philip Ching, aplixsearch.com website, version 5, published approx. Nov. 2003, worldwide.
Philip Ching, aplixsearch.com website, version 6, published approx. Oct. 2004, worldwide.
Philip Ching, Aplix Screenshots With Comments, published 2003, U.S.A.
Philip Ching, Dynamic Program/Project Management Aid, published 2002, U.S.A.
Philip Ching, A White Paper on Dynamic Program/Project Management Aid, published 2002, U.S.A.
Screen Shots illustrating SBYSCOMP system.
Chawathe et al., "Change Detection in Hierarchically Structured Information". Proceedings of the 1996 ACM SIGMOD International conference on Management of Data, Quebec Canada, 1996.
MacKenzie et al., "Comparing and Merging Files, diff. diff3, sdiff, cmp, and patch", GNU Manual, Sep. 1993, pp. 1-57.

* cited by examiner

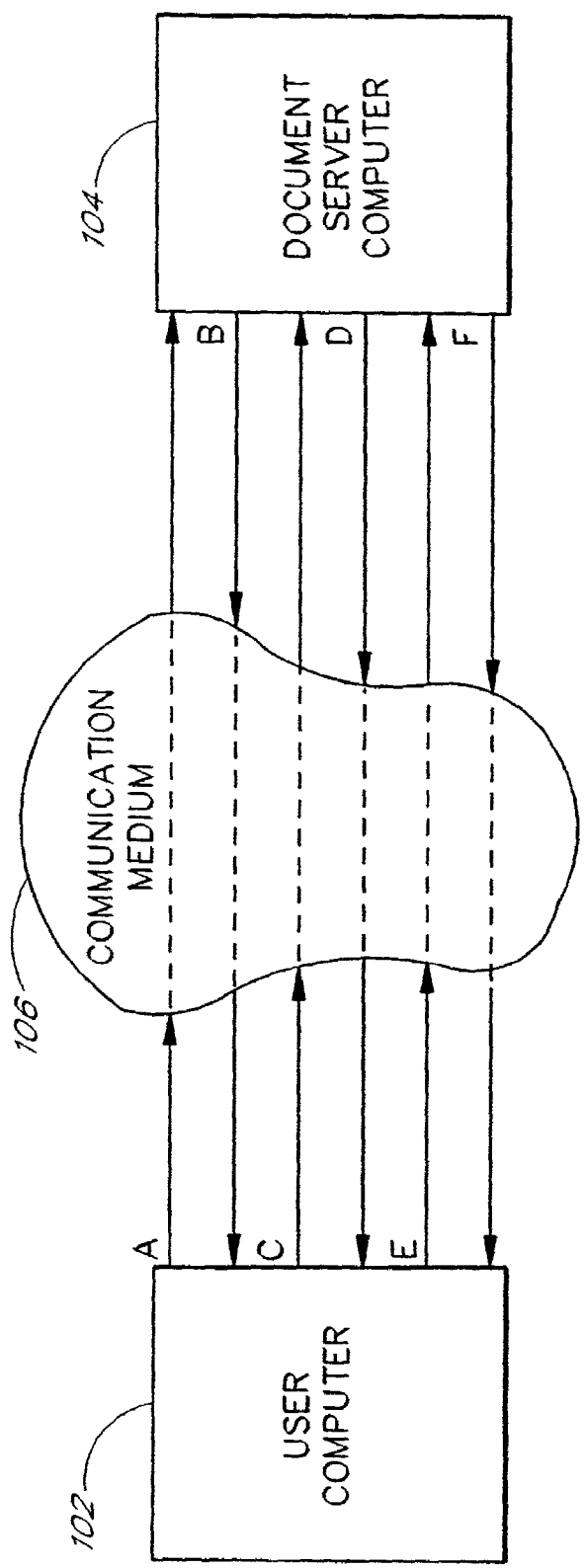

FIG. 3

A. USER SUBMITS PASSWORD TO ACCESS LIST OF DOCUMENTS AVAILABLE FOR CROSS-REFERENCE

B. DOCUMENT SERVER PRESENTS LIST OF DOCUMENTS AVAILABLE FOR CROSS-REFERENCE

C. USER SUBMITS A KEY PHRASE AND SELECTS FROM THE LIST TWO OR MORE DOCUMENTS TO CROSS-REFERENCE

D. DOCUMENT SERVER PRESENTS SIDE-BY-SIDE DISPLAY OF IDENTIFIERS WHICH IDENTIFY THE SEGMENTS OF EACH SELECTED DOCUMENT THAT CONTAIN THE KEY PHRASE

E. USER SELECTS TWO OR MORE SEGMENTS TO CROSS-REFERENCE

F. DOCUMENT SERVER PRESENTS SIDE-BY-SIDE DISPLAY OF CONTENTS OF SELECTED SEGMENTS

SELECT FILES FOR CROSS-REFERENCE:

KEY PHRASE [software documentation]

- ☒ VSCS
- ☐ ETVS
- ☐ DVRS
- ☐ NADIN
- ☐ SOW
- ☐ PMRs
- ☐ CDRLs
- ☐ STARS
- ☐ PTRs
- ☒ Emails_Faa
- ☐ MILSTD498
- ☐ SARP Vol1
- ☐ SARP Vol2
- ☐ SARP Vol3
- ☐ SARP Vol4
- ☐ SARP Vol5

[SUBMIT FOR CROSS-REFERENCE]  [CLEAR KEY PHRASE]

FIG. 6

KEY PHRASE: software documentation

VSCS                    Emails_Faa 3.10.2.2                Sat 03 Jan 98155908
4.2.2                   Sat 04 Jan 98120822
6.6.12.5                Mon 22 Aug 98185691
                        Wed 15 May 99384165

SUBMIT TO COMPARE       CLEAR THE SELECTION

FIG. 7 software documentation FROM:
VSCS/4.2.2

4.2.2 Software Implementation - All VSCS software shall be developed in accordance with programming standards approved by the FAA. These standards shall include the use of modern structured programming techniques, unit and variable naming conventions, readability, and the use of descriptive comments.

All software documentation shall be in accordance with FAA-approved standards. All off-the-shelf software shall meet the documentation standards. Any waiver from the above requirements shall be justified and submitted to the FAA for approval.

software documentation FROM:
Emails_Faa/Sat 03Jan98155908

Date: Sat, 03 Jan 1998 12:04:21 -0500 (EST)
From: "Steve Smith"
To: Janet Johnson
Subject: Re: software documentation cost
CC: Ron Rivers, Danielle Davidson On Sat, 3 Jan 1998, Janet Johnson wrote:
>I noticed since upgrading to 1.2.4 with RHP
>5.0 that customers are
>using JJPL model instead of SSKP model.
>Therefore, the software documentation cost
>is not included in the estimate.
>
>My question: Should the software
>documentation cost be part of this estimate?

FIG. 8

HIERARCHICAL DOCUMENT CROSS-REFERENCE SYSTEM AND METHOD

BACKGROUND

1. Field

The present invention relates generally to the field of document cross-reference. More particularly, the invention relates to a system and method for the storage, retrieval, and cross-reference of documents.

2. Description of the Related Art

The advent of text processing application programs has enabled the computer to become a viable tool for document creation and storage. A user is able to develop a document by entering the text comprising the document into the computer using such an application program. Typically, the document contents are stored on the computer in what is known as a file.

In a business or government setting there are often generated a large number of documents which contain portions that relate to a common topic. These documents exist in electronic files, typically in a database maintained by the business or government organization. It is often necessary to find and compare, i.e. cross-reference, each discussion of the topic in many different documents on the database. This typically involves a laborious process of opening each electronic file and searching for the topic, either manually or by employing a search utility built into a word processing program.

Commercially available word processing programs such as Word 97, from Microsoft Corporation, and WordPerfect version 8.0, from WordPerfect Corporation, permit the searching of documents by a key phrase. However, when a user is working with multiple documents these programs require the user to manually select and search each document in turn and to select each document sequentially to view the contents of the document that contain the key phrase. This is a time-consuming and laborious process.

SUMMARY

The present invention hierarchically cross-references one or more documents stored on a computer. The hierarchical cross-reference allows a user to efficiently identify and view only those segments within the documents that contain a key phrase on which the documents are cross-referenced.

In one preferred embodiment, a document server computer stores one or more documents in a document database. Additionally, the documents may advantageously be grouped into one or more document types or categories of documents. A category of document may advantageously be a logical grouping of types of documents including one or more versions of individual documents. The document server computer includes one or more web pages which are accessible by one or more users over a communication medium. The web pages enable a user to remotely input a key phrase and request a cross-reference of two or more documents on the key phrase. The documents stored in the document database include one or more segments. A document segment is an identifiable portion of a document. For example, a segment may be a chapter, section, subsection or paragraph. In one embodiment, the document database stores the document separated into its document segments.

A user employs a web browser executing on his or her user computer to connect to the document server computer. Once connected, the user can access the web pages and request a cross-reference of two or more documents. In one embodiment, the document server computer requests that the user specify a category of document to cross-reference. The document server computer may also request a user password to ensure that the user has authorization to access the requested category of document. Having verified the password, the document server computer lists the documents contained in the requested category of documents.

In one embodiment, the user can then select a first document and a second document (and additional documents if desired) from the list, input a key phrase and request the document server computer to cross-reference the selected documents on the key phrase. The segments in the selected documents are searched for the key phrase, and segments containing the key phrase are identified. The segments identified as containing the key phrase are listed in a side-by-side display on the user computer. One side of the display advantageously lists the identified segments from the first document and the other side of the display advantageously lists the identified segments from the second document. Additional side-by-side display portions may also be part of the side-by-side display, depending on the number of documents selected for cross-reference.

The user can then select a first segment from one list and a second segment from the other list (and additional segments if desired) and request the document server computer to cross-reference the selected segments on the key phrase. The document server computer searches the selected segments for the key phrase and the key phrase may advantageously be identified at two levels. Components within the segment that contain the key phrase are appropriately indicated as well as the actual elements or subcomponents which comprise the key phrase. For example, the document server computer can identify the sentence or paragraph containing the word or words as the component containing the key phrase, and accordingly identify the word or words comprising the key phrase as a unit or subcomponent. The document server computer then displays the contents of each of the selected segments in a side-by-side display on the user computer. The identified components and subcomponents are distinguished in the side-by-side display of selected segment contents so that the user can quickly compare the discussion surrounding the key phrase in each displayed segment.

The document server computer advantageously performs a document cross-reference in manageable hierarchies or stages. In one embodiment, upon receiving a request to cross-reference a category of document, the document server computer presents a list of documents in the requested category of documents. In response to a subsequent request for a cross-reference of two or more documents the computer presents a side-by-side list of segments in the selected documents that contain a key phrase. After the user inputs a further request for a cross-reference of two or more segments, the computer presents a side-by-side display of the contents of the segments with the actual key phrase, and/or the sentence, paragraph, etc. containing the key phrase, appropriately indicated for clarity and identification.

BRIEF DESCRIPTION OF THE DRAWINGS

These and other aspects, advantages, and novel features of the invention will become apparent upon reading the following detailed description and upon reference to the accompanying drawings in which:

FIG. 3 is a block diagram illustrating a flow of information between a user computer and a document server computer through a communication medium, according to one embodiment of the present invention;

FIG. 6 is a representation of one embodiment of an HTML page displaying a list of documents and a key-phrase prompt;

FIG. 7 is a representation of one embodiment of an HTML page displaying a side-by-side list of the segments of two documents containing the key phrase;

FIG. 8 is a representation of one embodiment of an HTML page displaying a side-by-side list of the contents of two segments of two documents.

DETAILED DESCRIPTION

Figure 1:
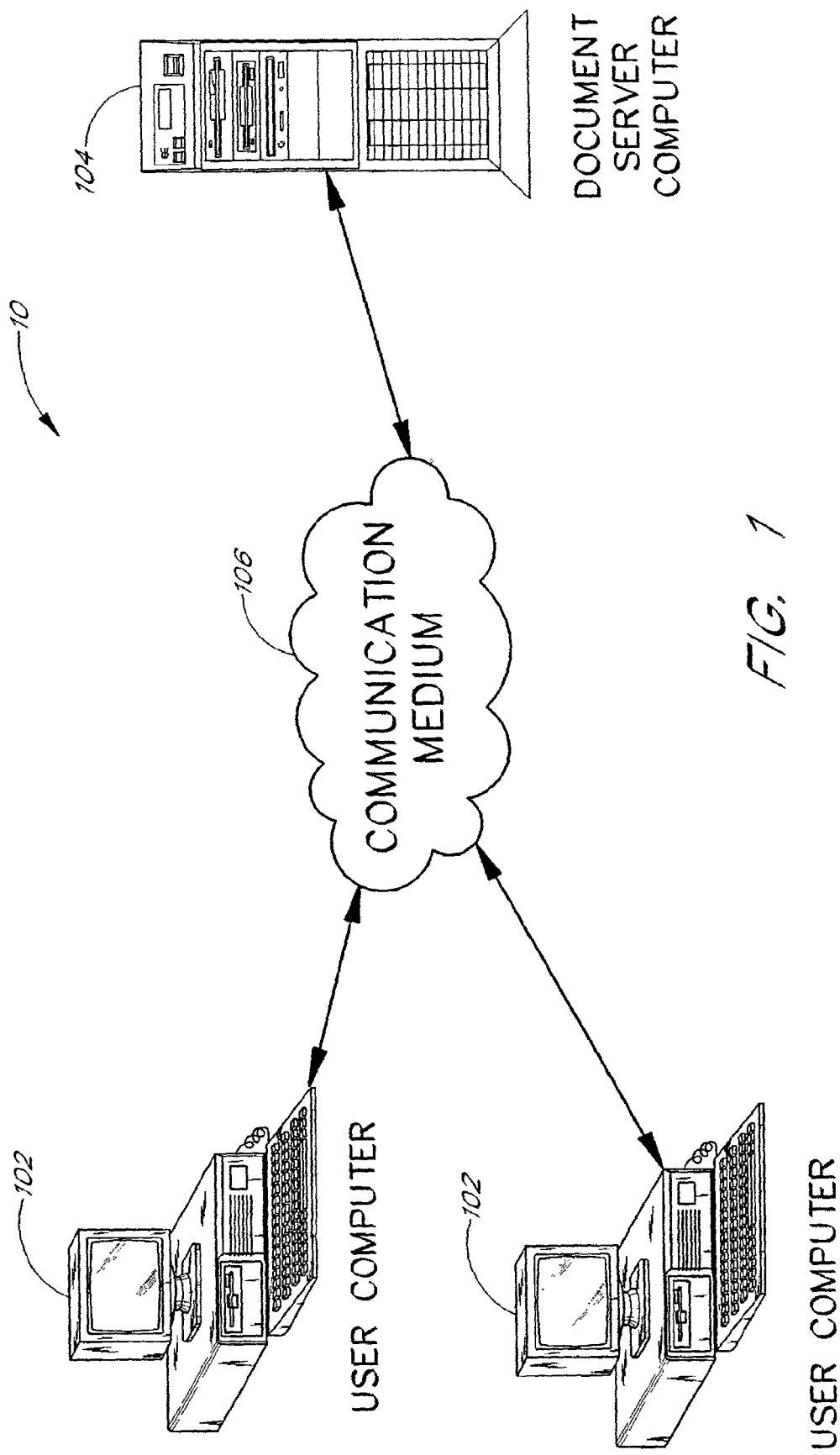
FIG. 1 is a system block diagram illustrating an embodiment of an overall network architecture.

A document server facilitates a hierarchical, side-by-side cross-reference of documents over a communication medium. Two or more documents are searched in hierarchies for a key phrase, and the result of the hierarchical search is presented in a side-by-side display. As an example, the complete document may advantageously be considered the top hierarchy. A segment of the document, such as a section or subsection within the document, can then be considered the next hierarchy. A component of the document segment, such as a paragraph or a sentence, can be considered the next lower hierarchy. Finally, subcomponents of the components, such as a phrase, word or a character, may advantageously be considered the lowest hierarchy. Occurrences of the key phrase in each hierarchy are identified with a distinct color and presented in a side-by-side manner.

In one embodiment of the invention, the document server includes a document database which stores the documents in electronic form. Typically, multiple documents are stored in the document database, and a user initiates a search of two or more documents for the purpose of cross-reference. The document server further comprises a web server and an interface module which enables access to the electronic contents stored in the document database. The web server provides connectivity to a communication medium such as the Internet and the World Wide Web (WWW). The document server includes a plurality of HTML page definitions (hereinafter referred to as HTML pages or web pages) accessible over the communication medium through the web browser.

A user employs a browser executing on a user computer to access the HTML pages on the document server. Using the HTML pages, the user submits identifying information to gain access to the documents stored in the document database. The document server authorizes the user to access a list of documents. The user may then select a particular document or documents and request the document server to perform certain operations such as, by way of example, cross-referencing the selected documents. Furthermore, because the document server is remotely accessible over the communication medium, multiple users located at differing geographical locations can access the document server and the documents stored thereon.

Although the invention is suitable for hierarchically cross-referencing any number (one or more) of documents or other electronic content stored on the document server at one time, the invention will be further disclosed in the context of hierarchically cross-referencing two documents and presenting the results in a side-by-side display. Because, as discussed, the invention is suitable for cross-referencing any number of documents, it is to be understood that three, four, or more documents may be cross-referenced, and their segments, etc. shown in a corresponding number of side-by-side displays. The example of two documents is thus merely a specific instance or embodiment of the inventive cross-reference system. Throughout the drawings, components which correspond to components shown in previous figures are indicated using the same reference numbers.

One network architecture suitable for use with one preferred embodiment of the invention is indicated generally by a system 10 in FIG. 1. The system 10 includes a plurality of user computers 102 and a document server computer 104 which communicate with each other by use of a communication medium 106. It is contemplated that the number of user computers 102 can range from very small (less than ten) to very large (in the thousands or millions), depending on the context in which the invention is used. It is also contemplated that the system 10 may include two or more document server computers 104.

A computer, including the computers 102 and 104, may be any microprocessor or processor (hereinafter referred to as processor) controlled device that permits access to the communication medium 106, including terminal devices, such as personal computers, workstations, servers, mini computers, main-frame computers, laptop computers, a network of individual computers, mobile computers, palm top computers, hand held computers, set top box for a TV, an interactive television, an interactive kiosk, a personal digital assistant, an interactive wireless communications device, or a combination thereof. The computers may further possess input devices such as a keyboard or a mouse, and output devices such as a computer screen or a speaker. Furthermore, the computers may serve as clients, servers, or a combination thereof.

These computers may be uniprocessor or multiprocessor machines. Additionally, these computers include an addressable storage medium or computer accessible medium, such as random access memory (RAM), an electronically erasable programmable read-only memory (EEPROM), programmable read-only memory (PROM), erasable programmable read-only memory (EPROM), hard disks, floppy disks, laser disk players, digital video devices, compact disks, CD-ROMs, DVD-ROMs, video tapes, audio tapes, magnetic recording tracks, electronic networks, and other techniques to transmit or store electronic content such as, by way of example, programs and data. In one preferred embodiment, the computers are equipped with a network communication device such a network interface card, a modem, or other network connection device suitable for connecting to the communication medium 106. Furthermore, the computers execute an appropriate operating system such as Unix, Linux, Microsoft® Windows® 3.1, Microsoft® Windows® 95, Microsoft® Windows® 2000, Microsoft® Windows® NT, Apple® MacOS®, or IBM® OS/2®. As is conventional, the appropriate operating system includes a communications protocol implementation which handles all incoming and outgoing message traffic passed over the communication medium 106. In other embodiments, while the operating system may differ depending on the type of computer, the operating system will continue to provide the appropriate communications protocols necessary to establish communication links with the communication medium 106.

The computers may advantageously contain program logic, or other substrate configuration representing data and instructions, which cause the computer to operate in a specific and predefined manner as described herein. In one embodiment, the program logic may advantageously be implemented as one or more modules. The modules may advantageously be configured to reside on the addressable storage medium and configured to execute on one or more processors. The modules include, but are not limited to, software or hardware components which perform certain tasks. Thus, a module may include, by way of example, components, such as software components, object-oriented software components, class components and task components, processes, methods, functions, attributes, procedures, subroutines, segments of program code, drivers, firmware, microcode, circuitry, data, databases, data structures, tables, arrays, and variables.

The communication medium 106 may advantageously facilitate the transfer of electronic content. In one embodiment, the communication medium 106 includes the Internet. The Internet is a global network connecting millions of computers. The structure of the Internet, which is well known to those of ordinary skill in the art, is a global network of computer networks utilizing a simple, standard common addressing system and communications protocol called Transmission Control Protocol/Internet Protocol (TCP/IP). The connection between different networks are called "gateways", and the gateways serve to transfer electronic data worldwide.

In one embodiment, the Internet includes a Domain Name Service (DNS). As is well known in the art, the Internet is based on Internet Protocol (IP) addresses. The DNS translates alphabetic domain names into IP addresses, and vice versa. The DNS is comprised of multiple DNS servers situated on multiple networks. In translating a particular domain name into an IP address, multiple DNS servers may be accessed until the domain name translation is accomplished.

One part of the Internet is the World Wide Web (WWW). The WWW is generally used to refer to both (1) a distributed collection of interlinked, user-viewable hypertext documents (commonly referred to as "web documents" or "web pages" or "electronic pages" or "home pages") that are accessible via the Internet, and (2) the client and server software components which provide user access to such documents using standardized Internet protocols. The web documents are encoded using Hypertext Markup Language (HTML) and the primary standard protocol for allowing applications to locate and acquire web documents is the Hypertext Transfer Protocol (HTTP). However, the term WWW is intended to encompass future markup languages and transport protocols which may be used in place of, or in addition to, HTML and HTTP.

The WWW contains different computers which store electronic pages, such as HTML documents, capable of displaying graphical and textual information. The document server computer 104 which provides information, for example, the electronic content to be hierarchically cross-referenced, on the WWW is generally referred to as a "website." A website is defined by an Internet address, and the Internet address has an associated electronic page. Generally, an electronic page may advantageously be a document which organizes the presentation of text, graphical images, audio and video.

One of ordinary skill in the art will recognize that the communication medium 106 may advantageously comprise other types of networks without detracting from the scope of the invention. The communication medium 106 can include, by way of example, local area networks (LANs), wide area networks (WANs), public internets, private intranets, a private computer network, a secure internet, a private network, a public network, a value-added network, interactive television networks, wireless data transmission networks, two-way cable networks, interactive kiosk networks, and the like.

In addition to the Internet, the communication medium 106 may advantageously include network service providers that offer electronic services such as, by way of example, Internet Service Providers (hereinafter referred to as ISP). An ISP or other network service provider may advantageously support both dial-up and direct connection in providing access to various types of networks. An ISP can be a computer system which provides access to the Internet. Generally, the ISP is operated by an ISP company. Examples of ISP companies include America On-line, the Microsoft Network, Network Intensive, and the like. Typically for a fee, these ISP companies provide a user a software package, username, password, and access phone number. Using this information, the user can then employ the user computer 102 to connect to the ISP and access the Internet. Those of ordinary skill in the art will realize that the ISP is optional and a computer can advantageously execute software programs providing direct access to the Internet. In this instance, the computer may be connected directly to the Internet.

In one embodiment, a user utilizes the user computer 102 and communicates with the document server computer 104 by accessing the communication medium 106. For example, the user invokes a browser which executes on the user computer 102. The browser is further discussed below. The browser, in turn, establishes a communication link to the Internet directly or through an ISP. Once connected to the communication medium 106, the user can direct the browser to access the information made available on the document server computer 104.

The document server computer 104 includes a plurality of web pages which facilitate the cross-reference of electronic contents stored on the document server computer 104. As an example, one or more documents are stored electronically on the document server computer 104. The cross-reference may be performed between two or more such documents or, alternatively, between two or more sections within a single document. The electronic contents may be information such as, by way of example, text, graphics, video, audio, images, audiovisual content, code, software or any other data capable of being stored on a computer. In one embodiment, the documents may advantageously include text or graphical information. In another embodiment, the documents may advantageously be comprised of audio information or video information. In still another embodiment, the documents can include any combination of the aforementioned forms of electronic content.

While communicating with the document server computer 104, the user is presented with a web page (a window displayed on the user computer 102) from which the user can remotely request a cross-reference of particular documents stored on the document server computer 104. The documents may be stored in a manner corresponding to a particular document type or category. A type of document or category of document may advantageously be a logical subject matter grouping of documents including one or more versions of each document (each version of which will advantageously be stored as a document in the system). The document server computer 104 can store one or more categories of documents or types of documents. By way of example, FAA documents as well as Department of Interior (DOI) documents may be stored on the document server computer 104. The FAA documents may advantageously be one category of document and the DOI documents may advantageously be another category of document. Typically, a category of document, such as the FAA documents, can consist of hundreds of documents. These documents may include, for example, the following documents: "Standards and Recommended Practices" and "Digital Voice Recorder." Furthermore, each document may be very large, consisting of thousands of pages. The thousands of pages can additionally be grouped into hundreds or even thousands of segments which the document may naturally be divided into. For example, the segments may advantageously be sections and subsections actually used and labeled in each document (hereinafter, segment, section, and subsection are used interchangeably).

A user such as an FAA official who desires to verify the consistency among all references, which are made in multiple documents, to aircraft landing-gear specifications may advantageously benefit by quickly and easily finding those references and comparing them in a side-by-side display. In another embodiment, a lobbyist could quickly implement or modify strategies by easily and efficiently cross-referencing and comparing all mentions made (in multiple documents) of the FAA specifications without having to pore through thousands of pages, or laboriously select and search each document in a sequential or "back-and-forth" fashion.

Having selected a category of document for cross-reference, for example, the FAA documents, the user, such as an FAA official, may be required to provide further identifying information, such as a password, to the document server computer 104. The document server computer 104 authenticates the user provided identifying information to ensure that the documents in the requested category of document are accessed only by authorized users. Having authenticated the user information, the document server computer 104 lists the documents contained in the requested category of document. Continuing the above FAA example, the documents contained in the FAA category of document, including the "Standards and Recommended Practices" document and the "Digital Voice Recorder" document, are presented to the FAA official in a selectable list.

The user can then select and submit two or more documents contained in the requested category of document for cross-reference by the document server computer 104. Continuing the FAA example, the FAA official can select the "Standards and Recommended Practices" and the "Digital Voice Recorder" documents from the selectable list, and input a key phrase for cross-reference within the documents by the document server computer 104. In one embodiment, the "Standards and Recommended Practices" document may be a telecommunications specification for international aviation defining the standards for the Aeronautical Telecommunication Network ("ATN").

Having received the user selected documents and key phrase for cross-reference, the document server computer 104 searches the selected documents for the key phrase. By way of example, one or both of the selected documents may contain sections with the following structure:

Section A
  Section A.1
    [text]
  Section A.2
    [text]
Section B
  [text]
Section C
  [text]

For the above document, the identifiable portions or segments of the document may advantageously be the sections containing the key phrase. For example, the segments may advantageously be "Section A.1," "Section A.2," "Section B," and "Section C." Then in searching the first document for the key phrase, the document server 104 may locate the key phrase in segments "Section A.1" and "Section C." In the second document, the document server 104 may locate the key phrase in segments labeled "Chapter 14" and "Chapter 22." Subsequently, the document server computer 104 presents a list of segments from each document which contain the key phrase in a side-by-side display. For example, if "Section A.1" is identified as containing the key phrase, the side-by-side display advantageously lists "Section A.1" as such.

Continuing the FAA example, the FAA official may advantageously select the "Standards and Recommended Practices" and "Digital Voice Recorder" documents and submit a key phrase for cross-reference within the documents by the document server computer 104. Subsequently, the document server computer 104 searches the two documents for the key phrase on a segment by segment basis. For example, the "Standards and Recommended Practices" document may include thousands of segments including two segments entitled "Routing of Messages" and "Security on the Internet," and the "Digital Voice Recorder" document may have segments such as "File Formatting" and "Digital-to-Analog Conversion." If the key phrase is found in the segment, the segment is identified as one containing the key phrase. Once all the segments in the documents have been searched, the identified segments are listed in a side-by-side display. For example, both the "Routing of Messages" segment and "File Formatting" segments may be listed in the side-by-side display as containing the key phrase. One display lists the identified segment(s) from the first document and the other display lists the identified segment(s) from the second document. If the key phrase is not found within a segment, that segment is not listed.

Subsequently, the user may advantageously select and submit one segment from the first list and another segment from the second list in the side-by-side display for cross-reference by the document server computer 104. The document server computer 104 then advantageously searches the contents of the submitted segments for the key phrase and identifies components, such as, by way of example, a paragraph or a sentence, within the segments that contain the key phrase. The contents of the submitted segments are presented to the user in a side-by-side display. One display shows the contents of one segment and the other display shows the contents of the other segment. Within each displayed segment, the key phrase is presented in a manner which distinguishes it from the rest of the contents of the displayed segment. For example, the key phrase can be presented in one color, such as blue, while the balance of the contents of the segment can be presented in a different color, such as red. In another embodiment, the contents of one submitted segment may be presented in a first color, such as green, while the contents of the other submitted segment may be presented in a second color, such as white, to further distinguish the contents of one segment from the contents of the other segment. The key phrase may alternatively be identified or distinguished in the display of the segment contents by means such as underlining, bolding, a change in font, etc. As a further alternative, these highlighting techniques may be used in a combination, such as both underlining the key phase and displaying it in a contrasting color.

Continuing the FAA example, the official may select and submit the "Routing of Messages" and the "File Formatting" segments (from the "Standards and Recommended Practices" and "Digital Voice Recorder" documents, respectively) for cross-reference by a key phrase, from the first and second lists in the side-by-side display. Subsequently, the document server computer searches the "Routing of Messages" and the "File Formatting" segments for the key phrase. The components of the segments containing the key phrase are identified. The contents of the "Routing of Messages" segment are displayed in one side of the side-by-side display. The contents of the "File Formatting" segment are displayed in the other side of the side-by-side display. The key phrase may advantageously appear in a different color or font than the rest of the contents of the respective segments.

One benefit of the invention is that it permits users to cross-reference very large documents in stages or hierarchies. At the initial or first hierarchy is the type of documents or category of documents. Each type or category of document is an element or node in the particular hierarchy. In the FAA example above, the FAA category of documents can advantageously be one node in the top hierarchy. Another node in the top hierarchy would be, for example, the DOI documents. The documents contained in the category of documents compose the next or second hierarchy. Each document is an element or node in this particular hierarchy. In the FAA example, each one of the hundreds of documents, including the "Standards and Recommended Practices" Document and the "Digital Voice Recorder" document, can advantageously be one node in the second hierarchy. The segments contained in a document compose the third hierarchy. In the FAA example, each one of the thousands of segments, including the "Routing of Messages" segment and the "Security on the Internet" segment, can advantageously be one node in the third hierarchy. The components contained in the segments are elements in a fourth hierarchy. For example, each sentence (component) identified as containing the key phrase can advantageously be considered one node in the fourth hierarchy. Finally, subcomponents (i.e., the word or words comprising the key phrase) of the segments may be considered a fifth hierarchy.

Thus, the invention advantageously cross-references documents in a layered or hierarchical manner. The documents can be very large, as large as computer memory may allow. In one embodiment, requesting a cross-reference of a particular category of documents (an element in the first hierarchy), which may comprise a simple search of the documents in the category for the key phrase, results in a listing of the documents that contain the key phrase, or, alternatively, a listing of all of the documents in the category (the listing of elements in the second hierarchy). Requesting a cross-reference by the key phrase of two or more listed documents (elements in the second hierarchy) results in a listing of the segments contained in the selected documents (elements in the third hierarchy) containing the key phrase. Requesting a cross-reference of two or more segments (two or more elements in the third hierarchy) results in the display of segment contents with the components (elements in the fourth hierarchy) and the subcomponents (elements in the fifth hierarchy) being further distinguished in the display for ease of identification. Those of ordinary skill in the art will realize that there may be additional hierarchies or fewer hierarchies without detracting from the hierarchical cross-referencing element of the present invention.

Figure 2:
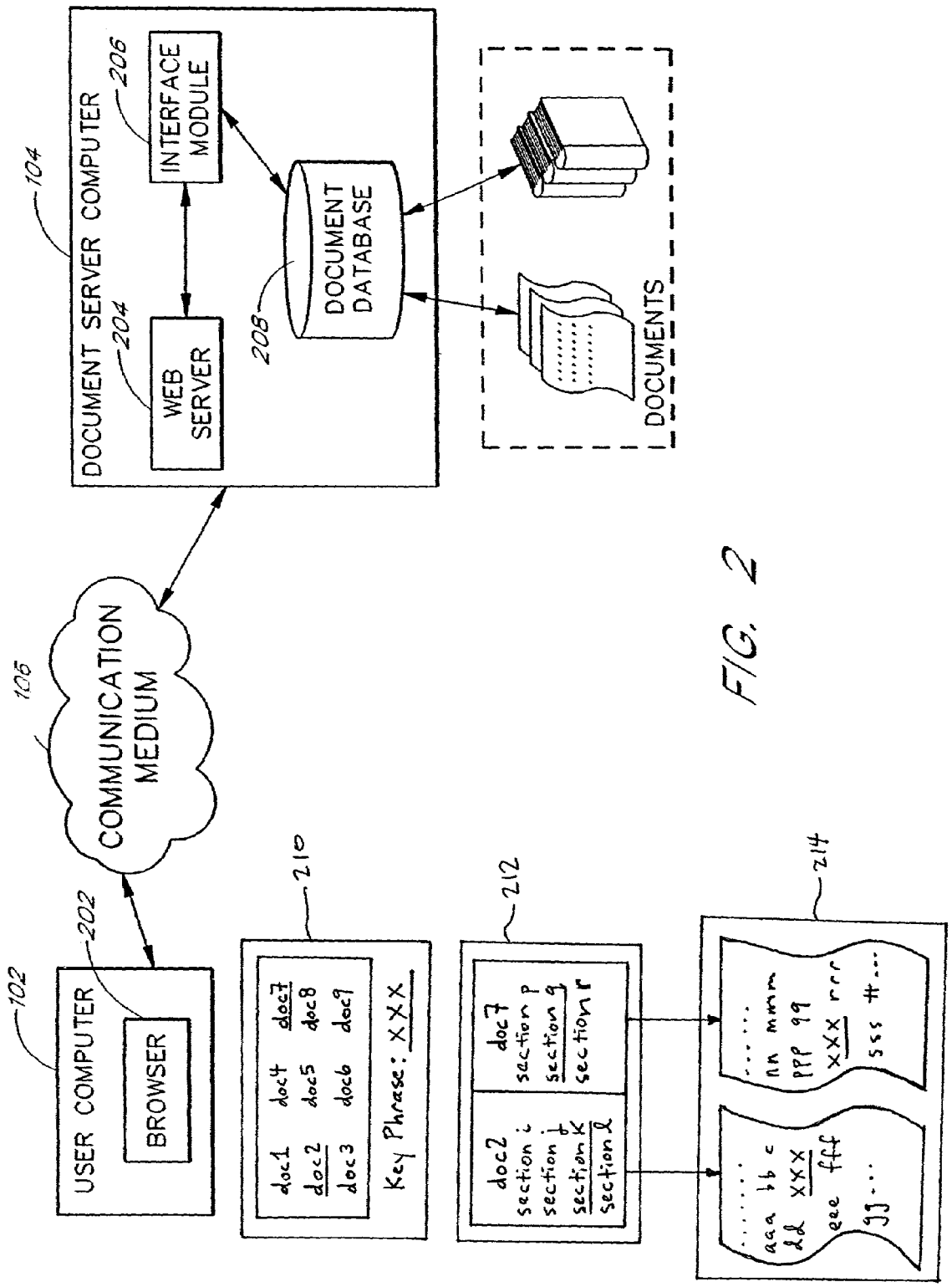
FIG. 2 is a high level block diagram illustrating one embodiment of the selected components of a user computer architecture and a document server computer architecture.

FIG. 2 illustrates in more detail selected components of the user computer 102 and the document server computer 104 of FIG. 1 suitable to implement one embodiment of the present invention. The user computer 102 includes a browser 202. The document server computer 104 includes a web server 204, an interface module 206, and a document database 208. The depicted components may advantageously communicate with each other and other components comprising the respective computers through mechanisms such as, by way of example, interprocess communication, remote procedure call, and other various program interfaces. Furthermore, the functionality provided for in the components, modules, and databases may be combined into fewer components, modules, or databases or further separated into additional components, modules, or databases. Additionally, the components, modules, and databases may advantageously be implemented on one or more computers.

The browser 202 is a software program which allows a user to access different computers, including the document server computer 104, through the communication medium 106. In one preferred embodiment, the browser 202 may be a standard browser such as the Netscape® Navigator developed by Netscape, Inc. or the Microsoft® Internet Explorer developed by Microsoft Corporation. One of ordinary skill in the art will realize that other types of access software could also be used to implement the browser 202. The other types of access software could be, by way of example, other types of Internet browsers, custom network browsers, two-way communications software, cable modem software, point-to-point software, custom emulation programs, and the like.

Figure 4:
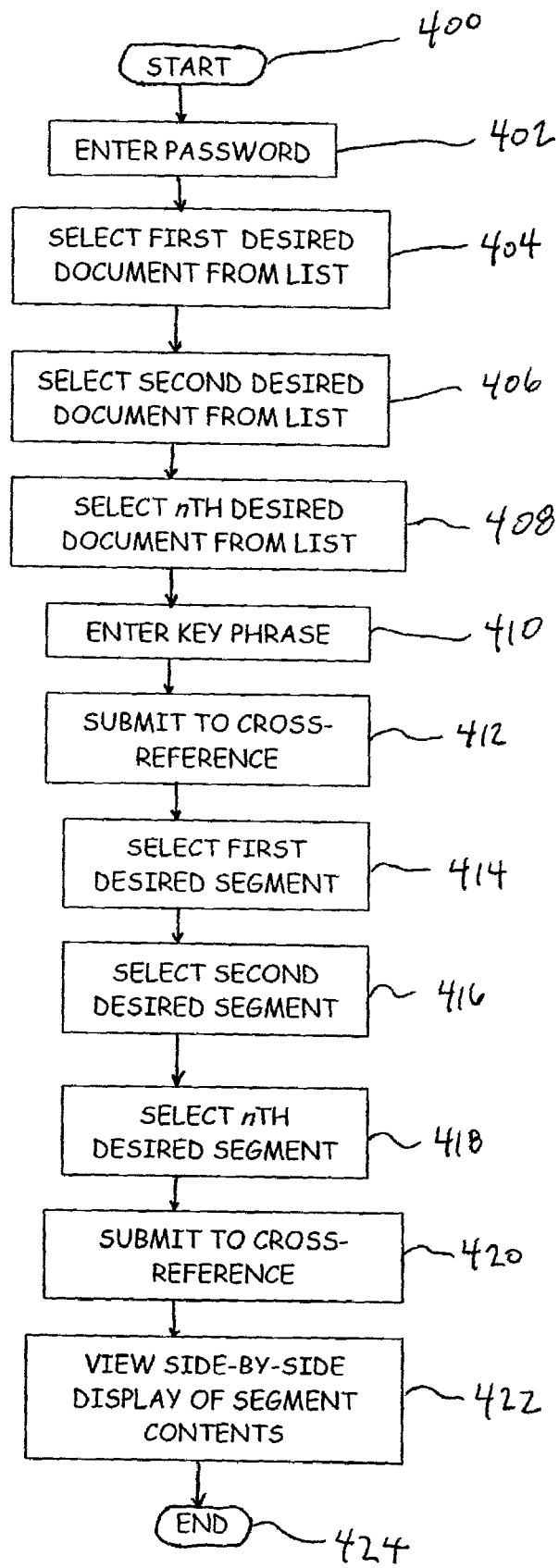
FIG. 4 is a flowchart illustrating a process by which a user requests the cross-reference of two documents in accordance with one embodiment of the present invention.

A user employs the browser 202 to access the document server computer 104, and more particularly, the web pages which facilitate the hierarchical side-by-side cross-reference of documents, and requests that a document cross-reference be performed by the document server computer 104. One embodiment of a process by which a user requests a cross-reference of two documents is illustrated by the flow chart in FIG. 4. Beginning in a start state 400, the user initiates the execution of the browser 202 on his or her user computer 102. The user directs the user computer 102, utilizing the browser 202, to establish a communications link or network connection to the document server computer 104 through the communication medium 106. Having successfully established the network connection, the user is presented with a first web page stored on the document server computer 104 in state 402. In particular, the browser 202 displays the first web page which prompts the user for a password, and may, in addition, provide the user the capability to select a category of document to be cross-referenced by the document server computer 104. In one embodiment, a list of categories of documents stored on the document server computer 104 that can be cross-referenced may advantageously be presented to the user through a pull-down menu. From the list of the categories of documents, the user can use a pointing device, such as a mouse or the like, and select the desired category of document to cross-reference. In another embodiment, the first web page may contain a data entry field conducive to accepting input from the user. The user may then use an input device, such as a keyboard, microphone, and the like, and specify the desired category of document.

In state 402, the user provides a password, or other identifying information, to the document server computer 104. In one embodiment, the password is entered through the same web page through which the user may specify the category of document. In another embodiment, the document server computer 104 may present the user a different web page which is to be used to provide the password. In still another embodiment, the user may not be required to provide a password to utilize the document cross-reference facility. In yet another embodiment, certain selected categories of documents, such as, by way of example, categories of documents containing confidential, classified, or sensitive documents, may require a password from the user. In states 404–408, the user, in response to a web page 210 (see FIG. 2) displaying a list of documents available for cross-reference, selects two or more documents in which the cross-reference is to be performed. In state 410, the user enters a key phrase by which the selected documents are to be cross-referenced. The key-phrase request may be performed through either the same web page 210 through which the user selected the documents, the same web page through which the user provided the password, or through still another web page altogether. Likewise, each document may be selected in individual web pages. Those of ordinary skill in the art will realize that the particular ordering of the states 402–410 is not critical, and that the aforementioned states may be rearranged in a different order, or even possibly omitted, without detracting from the scope of the invention. For example, the entry of the key phrase (state 410) may occur before or during the selection of documents from the list (states 404–408).

In state 412 the user submits the selected documents and key phrase to the document server for cross-reference, via a mouse click on an appropriate screen "button," keystroke, etc. Subsequently, the user is presented a web page containing a side-by-side list 212 (see FIG. 2) of the segments from each selected document that contain the key phrase. One list identifies the segments from the first selected document, and a second list identifies the segments from the second selected document. Additional lists may be presented so that the overall number of lists corresponds to the number of documents selected for cross-reference; again, the invention is not limited to the selection or cross-reference of only two documents.

Proceeding to states 414–418, the user selects two or more segments from the list for further cross-reference. The user then submits the selected segments to the document server computer 104 for cross-reference in state 420. In one embodiment, the user may select any one segment from the list corresponding to the first document and any one segment from the list corresponding to the second document. In another embodiment, the user may select any two or more of any of the segments displayed in any of the lists. This may include, for example, the selection of two or more segments from the same document (and none from the other document(s) displayed) for cross-reference. The document server computer 104 advantageously searches the submitted segments for the key phrase and appropriately identifies the components contained within the submitted segments containing the key phrase.

Subsequently, the user is presented a web page containing a side-by-side display 214 (see FIG. 2) of some or all of the contents of the selected segments. The contents of the first selected segment are displayed in one display window or portion while the contents of the second selected segment are displayed in a second display window or portion adjacent the first. Of course, the actual number of side-by-side display portions corresponds to the number of selected segments, the user not being limited to the selection of two. In each display portion, the components of the segment containing the key phrase are appropriately identified. In the case of a textual document, the component may advantageously be a sentence or a paragraph. In the case of a graphical document, the component may be a number of pixels or lines of display. In the case of a video display, the component may be a number of frames. Those of ordinary skill in the art will realize that the division of documents into components is frequently a matter of choice for a document author and may differ depending on the document type. The components may be appropriately distinguished in the display by a difference in color, font, type size, intensity, contrast, and the like. Within the components, the actual key phrase, such as, by way of example, a word, letter, byte, bit, or pixel, may be further distinguished. Once the user has viewed the contents of the segments (state 422), the document cross-reference process proceeds to end state 424.

With further reference to FIG. 2, the web server 204 provides access to the communication medium 106 and delivers the plurality of web pages stored on the document server computer 104 to the one or more user computers 102. The plurality of web pages facilitate the cross-reference of documents stored in the document database 208. It is contemplated that the web server 204 uses standard web server software applications such as, by way of example, public domain software from NCSA and Apache, and commercial packages such as Netscape's Internet Server software, Microsoft's Internet Server software, and the like. These web pages are accessible by users executing a standard browser on the user computer 102. In another embodiment, a proprietary or non-standard software application is employed to provide access to, and delivery of, the plurality of web pages. In this case, the user can execute a comparable software program, capable of interfacing to the proprietary or non-standard software executing on the document server computer 104, on the user computer 102 to access the web pages on the document server computer 104.

The interface module 206 performs the requested document cross-reference and facilitates communication between the web server 204 and the document database 208. For example, the document server computer 104, in processing a request to cross-reference documents, receives the request through the web server 204. The web server 204 extracts the necessary information, and this information is advantageously processed by the interface module 206. As part of the processing, the interface module 206 accesses the documents and other data stored in the document database 208. Furthermore, the interface module 206 performs necessary operations, such as, by way of example, searching the document contents and presenting some or all of the document contents to the user through the web server 204, on the document contents and other data retrieved from the document database 208 in the manner disclosed herein.

In one embodiment, the interface module 206 uses the Common Gateway Interface (CGI) protocol to process the information gathered from, and presented to, the user through the web server 204. The other operations, such as, by way of example, searching the document contents and identifying the segments containing the key phrase, performed by the interface module 206 as disclosed herein may advantageously be implemented using scripting languages, such as Unix/Linux shell (sh, ksh, or bash), PERL and JavaScript, and other standard programming languages such as Java, C and C++. Furthermore, the interface functionality enabling the interface module 206 to access the document database 208 may be implemented using the application language suited for the particular document database 208, such as the various standard and scripting languages mentioned above. Those of ordinary skill in the art will realize that the selection of the particular software language is not critical, and that, any software language capable of implementing the functions and features described herein may be used without detracting from the scope of the invention.

Figure 9:
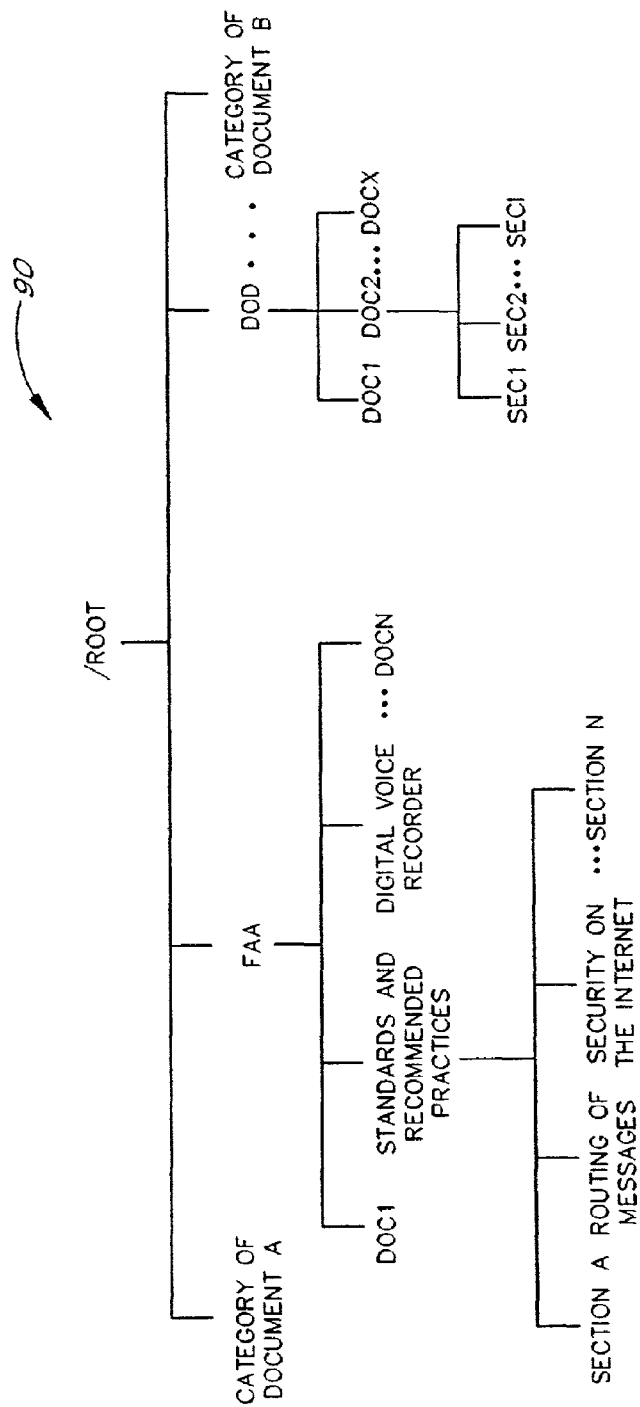
FIG. 9 is a representation of one embodiment of a document database of the invention.

The document database 208 is a repository for the documents stored on the document server computer 104. In one embodiment, the document database 208 utilizes a hierarchical file system, such as the Unix/Linux file system, in implementing the document repository. The structure of the hierarchical file system facilitates the storage of the electronic contents in one or more hierarchies or levels. As is generally illustrated by the document tree 90 in FIG. 9, at the top level is the root directory. Below the root directory is a directory containing the one or more categories of documents. Each category of document is an element or node in this level. Below each category of document may be one or more directories representing the documents contained within the particular category of documents. Each document is an element or node in this level. For example, as is illustrated in FIG. 9, the category of document "FAA" may be one node in the categories-of-documents level and may contain hundreds of documents titled "DOC1" through "DOCN," including the "Standards and Recommended Practices" document and the "Digital Voice Recorder" document. As is also illustrated in FIG. 9, the category of document "DOD" may be another node in the categories-of-documents level and may include the documents "DOC1" to "DOCX." Below each document directory are one or more files containing the contents of the respective document. In one embodiment, each file may advantageously correspond to a segment contained in a document.

Certain documents contain segment delimiters such as chapters, sections, and subsections. In one embodiment, the smallest unit, such as a section or subsection, containing text may be considered a segment and stored in a separate file. In another embodiment, a section may be considered a segment, and each section of the document, including all subsections contained within the section, may be stored in separate files. Other documents may not contain segment delimiters, but may be continuous in form. In this instance, the document server computer 104 may create artificial segments in the process of storing the document in the document database 208. For example, for a text document, a selected number of lines of text may be considered a segment. For a video document, a selected number of frames may be considered a segment. In still another embodiment, the document server computer 104 may advantageously contain program logic capable of parsing the document contents and subsequently generating segments, and titles or segment headings for the created segments, based on the program's interpretation of the document contents. As an example, the program logic may advantageously parse the contents of a video document and create segments and segment headings based upon the program's perceived interpretation of the video document by, for example, detection of differences in image, color, patterns, contrast, etc. between various series of frames. Those of ordinary skill in the art will realize that the actual number files containing the document contents can vary based on the determination of what a segment is for a particular document during the storing of the document in the document database 208.

In another embodiment, more layers may be present in the directory tree 90. For example, the "Standards and Recommended Practices" document may be composed of five volumes, "VOL1" through "VOL5." In this instance, the node "Standards and Recommended Practices" may advantageously contain five directories or nodes representing the five volumes.

In still another embodiment, more directories may be present depending on the number of versions of the document that are stored on the document database 208. As an example, the document server computer 104 may advantageously store all the PTO documents as one of the category of documents in the document database 208. The "PTO" category of documents may consist of hundreds of documents. These documents may include, for example, the following documents: "Manual of Patent Examining Procedure" ("MPEP") and "Trademark Manual of Examining Procedure" ("TMEP"). Furthermore, each document may be very large, consisting of hundreds or thousands of pages. Additionally, the three most recent editions of the MPEP may be stored in the document database 208. The document server computer 104 may advantageously permit users, such as patent attorneys, to cross-reference specific topics among the three stored editions of the MPEP. The edition identifier, such as, by way of example, the edition number, the month and year designation, or a combination of both, may be used to distinguish the document versions. For example, the three editions of the documents may be appropriately identified by the text strings "/PTO/MPEP/FIFTHEDITION," "/PTO/MPEP/SIXTHEDITION," and "/PTO/MPEP/SEVENTHEDITION." Segments of each document may advantageously correspond to the numbered sections and subsections appearing in the respective MPEP edition.

A patent attorney interested in quickly cross-referencing a topic among the three editions of the MPEP may then use a user computer 102 and remotely access the document server computer 104. The patent attorney can then request to cross-reference the "PTO" category of document. Upon receiving a listing of documents contained in the requested "PTO" category of document, the patent attorney may advantageously select one or more versions of the MPEP document for cross-reference by the document server computer 104. The document server computer 104 may advantageously list the segments contained in each of the three editions of the MPEP which contain a key phrase (entered by the attorney and corresponding to a topic of interest) in a side-by-side-by-side display. In one embodiment, if one segment in one edition of the MPEP is found to contain the key phrase, that segment's segment identifier is listed in that portion of the side-by-side-by-side display corresponding to the selected MPEP edition. The patent attorney may then advantageously select one segment identifier from each of the three lists for cross-reference by the document server computer 104. The document server computer 104 may then display the segment contents in a side-by-side-by-side display appropriately distinguishing the key phrase.

In another alternative embodiment, the document server computer 104 may list the three editions of the MPEP in a web page and request the user to select two of the three editions of the MPEP for cross-reference. The patent attorney may then select two editions for cross-reference by the document server computer 104. Subsequently, the two specified editions of the MPEP can be cross-referenced by the document server computer 104. In still another alternative embodiment, the MPEP document may advantageously include both editions and revisions of the MPEP. In this instance, differing versions of the document may be identified by, for example, a combination of the edition number, the month and year designation, and the revision number. Those of ordinary skill in the art will realize that the version indicators, such as "OLD" and "NEW" directories, may be located in another hierarchy or level in the document tree 90 without detracting from the scope of the invention.

In another embodiment, the document database 208 may be implemented with Structured Query Language (SQL) code. SQL is a relational database language standardized by the International Standards Organization (ISO). The document database 208 can be implemented utilizing any number of commercially available database products such as, by way of example, Microsoft® Access and the like. In still another embodiment, the document database 208 may conform to any database standard, or may even conform to a non-standard, private specification. The hierarchical structure of the document database 208 may be implemented using the selected database. In still another embodiment, the documents may be stored in the document database 208 in units of storage recognized by the particular database, and the contents of the units may be identified, retrieved, compared, modified, and listed in order to facilitate the hierarchical cross-reference of the electronic contents as disclosed herein.

Figure 5:
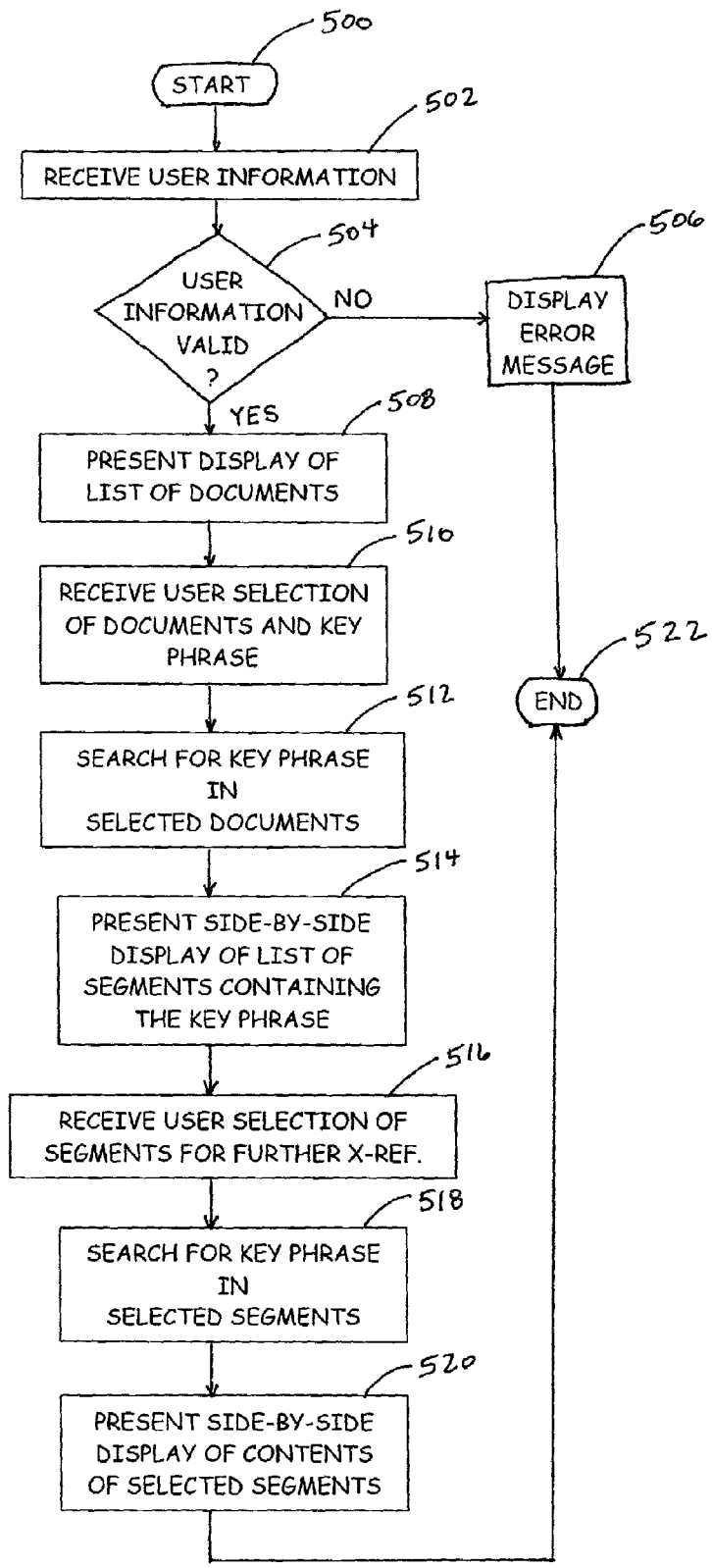
FIG. 5 is a flow chart illustrating a process by which two documents are cross-referenced in accordance with one embodiment of the present invention.

One embodiment of the interaction between the components of the document server computer 104, in particular the web server 204, the interface module 206, and the document database 208, in processing a document cross-reference request is generally illustrated in FIG. 5. Beginning in a start state 500, the document server computer 104 receives a user request to perform a document cross-reference in state 502. The document server computer 104 receives the user's identifying information such as, by way of example, a password, and may also receive the requested category of document to cross-reference.

Proceeding to state 504, the user's identifying information is validated to ensure that the user is authorized to access the information contained in the specified category of document. In one embodiment, a data record may advantageously be used to maintain a list of users authorized to access the one or more categories of documents stored in the document server computer 104. The document server computer 104 can locate the data record for the particular category of document specified by the user and verify that the received user identifying information is found in the list of authorized users. By way of example, the user may specify "DOD" as the category of document and submit a password. Upon receipt of this request, the document server computer 104 can locate the "DOD" data record and determine if a password is required for access. If no password is required, then access is granted. If a password is required, then the "DOD" data record is searched to locate the submitted password. If the submitted password is not found in the "DOD" data record, an error message is displayed on the user computer 102 in state 506 and the document server computer 104 proceeds to end state 522. Alternatively, the user may be redirected to the previous page and prompted for correction of the identifying information.

If the selected category of document is not password protected, or the user submitted password is found in the selected category's data record, the document server computer 104 displays a list of the documents contained in the category in state 508. Each document name is displayed alongside a check box or is otherwise associated with a "toggle" indicator for identifying the selected and non-selected documents. The display in state 508 also contains a prompt for the key phrase on which the cross-reference is to be performed.

One embodiment of the display of the list of documents and key-phrase prompt is generally illustrated in FIG. 6. The display can list the documents "VSCS" through "SARP Vol5" in an appropriate format, with each document name adjacent to or associated with a check box as detailed above. From this screen, the user may advantageously enter the key phrase "software documentation" in the key-phrase prompt and use a pointing device, such as a mouse or the like to select the documents "VSCS" and "Emails_Faa," and subsequently submit the documents and key phrase for cross-reference.

Proceeding to state 510, the document server computer 104 receives the user submitted key phrase and documents for cross-reference. The selected documents are searched for the key phrase in state 512. In one embodiment, each document segment in the selected documents is advantageously searched for the key phrase, and the particular segments are identified accordingly. In performing the search, the computer 104 advantageously stops searching a particular segment once it has found one instance of the key phrase in the segment (and then flags that segment as containing the key phrase); thus the search may proceed more quickly through all of the segments. Alternatively, the computer 104 may search the entire segment and locate all instances of the key phrase, in order to rank the segments by the number of key-phrase "hits" in the segment. As a further alternative, the computer 104 may locate all instances of the key phrase in one pass through the document and prepares a log of all key-phrase hits in the document and the location (segment, sub-segment, sub-sub-segment, down to the lowest level of the hierarchy) of each hit. The log obviates the need for some or all of the subsequent searches at lower levels in the hierarchy by providing a complete and accessible record of all instances of the key phrase in the document.

The document segments containing the key phrase are presented to the user in a side-by-side display in state 514. One embodiment of the side-by-side display of the list of segments containing the key phrase is generally illustrated in FIG. 7. In a first list are presented segment identifiers corresponding to the identified segments from the first document submitted, and in a second list are presented segment identifiers corresponding to the identified segments from the second document submitted. The segment lists may be presented in a scrollable display; in one embodiment the segment identifiers are listed or ranked according to the number of instances of the key phrase within the corresponding segment. In another embodiment, the segment identifiers are listed according to the numerical, etc. order in which the corresponding segments appear in the underlying document. Continuing our example, the cross-reference of the requested documents "VSCS" and "Emails_Faa" on the key phrase "software documentation" may have identified the segments listed in the side-by-side segment list illustrated in FIG. 7. Utilizing this list, the user can quickly identify the document segments containing the key phrase. From this screen, the user can identify and submit one or more segments to the document server computer 104 for further cross-reference. For example, the user can select and submit the segments "4.2.2" and "Sat03Jan98155908" to the document server computer 104, whereupon the contents of the submitted segments are advantageously displayed to the user. Note that the labels or segment identifiers for the document segments could be any label useful to the user.

Thus, for example, the text of the section heading could be included in the label/identifier.

Proceeding to state 516, the document server computer 104 receives the user submitted segments for further cross-reference. In state 518, the specified segments are searched for the key phrase (previously entered in state 502). In other words, the key phrase search or cross-reference is now performed at the segment level (the next level in the hierarchy), rather than at the document level as was done at the previous step in our example. Segment components, such as, by way of example, sentences, paragraphs, images, photographs, and video frames, containing the key phrase are identified. The subcomponents comprising the key phrase, such as, by way of example, words, letters, pixels, and frames, are further identified.

Proceeding to state 520, the document server computer 104 displays the contents of the particular segments in a side-by-side display as generally illustrated in FIG. 8. Each display is clearly identified to indicate the segment being displayed. The contents of one requested segment are displayed on one side and the contents of the other requested segment are displayed on the other side. If only one segment was submitted for further cross-reference in state 516, then only that segment's contents are displayed, and one of the displays may advantageously be empty, or simply not shown. Furthermore, the displays may be scrollable to provide the user ease of navigation in viewing the displayed contents. In another embodiment, the contents of the particular segments may be displayed in one display or screen. In the display, the key phrase itself and/or the components containing the key phrase may advantageously be indicated by methods such as, by way of example, underlining, "redlining," or the use of differing colors.

Once the user has viewed the side-by-side display of the contents of the selected segments, the user may be directed to end state 522 or redirected to any of the previous states or pages, to perform further document cross-referencing.

Continuing the example from above, the contents of "VSCS/4.2.2" are displayed on the left in the side-by-side display (see FIG. 8). The contents of "Emails_Faa/Sat03Jan98155908" are displayed on the right in the side-by-side display. The key phrase "software documentation" is highlighted in the text comprising the contents of the respective document segments.

In another embodiment, the electronic contents stored in the document database 208 may include voice information. In cross-referencing and presenting the relevant segments of the voice information, the document server computer 104 can transform the voice information into textual form and present the textual form of the voice information, with the appropriate segments indicated, to the user in the side-by-side display. Furthermore, the voice information may advantageously be stored in the textual form in the document database 208. Thus, the voice information may advantageously be separated and stored in logical segments. These segments may comprise, for example, divisions by topic, or by time (30-second segments, one-minute segments, etc.), or by speaker. In still another embodiment, the voice information may be stored in the document database 208 as sound signals, and these signals can subsequently be separated into logical segments, cross-referenced on an orally spoken key phrase, and presented to the user through a speaker attached to the user computer 102.

In still another embodiment, the electronic contents stored in the document database 208 may include video information. The video information may be separated into logical segments such as, by way of example, different scenes, different half-hour or one-hour TV shows, different topics, a predetermined length of time, or a predetermined number of frames. In cross-referencing various documents comprising the video information, the document server computer 104 can search the appropriate segments of the video and determine the segments containing the key phrase. In one embodiment, the document server searches the actual digitized video information to detect instances of the key phrase, such as a pattern, image, frame, scene, or a series of patterns, images, frames, scenes, etc. representing a specific event, person, object, motion, etc., by detecting specific values or patterns of values which correspond to the key phrase in the data comprising the digitized video. In another embodiment, the document server searches a text summary of what is being shown in the video.

The segments containing the key phrase can be presented to the user in a side-by-side display as disclosed herein. The user can then select one or more video segments for further cross-reference by the document server computer 104. The document server computer 104 can identify components within the video segments that contain the key phrase. The submitted video segments can then be played in the side-by-side display with one video segment playing in one display and the other video segment playing in the other display. The video segments can be played simultaneously in the side-by-side display. Alternatively, the user may control the playing of the individual video segments. Furthermore, when a component of the video segment containing the key phrase is playing, an appropriate indicator, such as a light or banner message, may appear on the display alerting the user to the fact that the video segment being displayed on one or both of the side-by-side displays is a component of the video segment containing the key phrase. It is contemplated that a similar approach would be taken for segments of a recorded sound document such as music. The music may advantageously be segmented by song, by album, by artist, by time (such as 8-minute segments of a desired work of classical music or a 10-second segment of a 3-minute pop song), by subject, or by genre.

FIG. 3 illustrates one embodiment of the flow of information between a user computer 102 and the document server computer 104 when the user accesses the web pages stored on the document server computer 104 in requesting a document cross-reference. In event A, the user utilizes a browser 202 executing on his or her user computer 102 and accesses the document server computer 104 through the communication medium 106. In particular, through a web page stored on the document server computer 104, the user submits information including a user password and, if applicable, a category of document to cross-reference. In event B, the document server computer 104 verifies the user submitted information and displays a list of documents available for cross-reference in a web page. Through this web page, the user can select two or more documents for cross-reference by the document server computer 104 in event C.

In event D, the document server computer 104 cross-references the user specified documents on the key phrase. In particular, the cross-reference is performed by identifying segments within the documents that contain the key phrase. Segments containing the key phrase are appropriately identified and their segment identifiers are displayed to the user in a side-by-side display through a web page displayed on the user computer 102. For example, the identified segments from the first specified document may advantageously be listed in one of the side-by-side displays. The identified segments from the second specified document may advantageously be listed in the other of the side-by-side displays.

Through this web page, the user advantageously selects two or more identified segments for further cross-reference by the document server computer 104 in event E. For example, the user may select a segment from the first specified document and a segment from the second specified document. In another embodiment, the user can select two segments from the same display or more than two segments in total from one or both displays. In event F, the document server computer 104 searches the selected segments and identifies the area or region of the segment containing the key phrase. The document server computer 104 then displays the contents of the user selected segments in a side-by-side display through a web page displayed on the user computer 102. In the side-by-side display, the key phrase itself and, optionally, the identified region or area of the segment containing the key phrase, are displayed in a contrasting manner for easy identification by the user.

Subsequent to viewing the contents of the requested segments, the user can reaccess the side-by-side list of segments containing the key phrase and select one or more different segments from the side-by-side display for cross-reference by the document server computer 104. In one embodiment, the plurality of web pages facilitating the cross-reference of documents can be implemented with a "previous page" button well known to those of ordinary skill in the art. The user can use a pointing device, such as a mouse or the like, and click on the "previous page" button in the web page displaying the contents of the selected segments to access the side-by-side list of segments containing the key phrase. The user may then advantageously select one or more segments for cross-reference by the document server computer 104. This process may be repeated until the user has selected and viewed the appropriate portions of the desired segments. Thus, the user may, but is not required to, re-specify the category of document, or the documents of interest, after each cross-reference of the requested segment(s) by the document server computer 104.

In another embodiment, the web pages facilitating the cross-reference of documents as disclosed herein may advantageously include a text entry area. The user may then specify one or more documents in the text entry area. Alternatively, the user may also specify one or more segments in the text entry area. The document server computer 104 may advantageously receive the one or more documents or the one or more sections entered by the user in the text entry area (as well as a key phrase as disclosed above) and subsequently perform the appropriate cross-reference. Thus, a more knowledgeable user may, but is not obliged to, make selections from the sequence of side-by-side displays in performing a document cross-reference. The more knowledgeable user may circumvent the sequence of making selections through the side-by-side displays by specifying the desired documents or segments for cross-reference through the text entry area.

The invention advantageously performs an efficient cross-reference of two or more documents contained within a category of documents. The documents are searched in hierarchies or stages. In the first stage, the documents contained in the requested category of documents are presented. Subsequently, if particular documents are selected for further cross-reference, the documents' segments are searched for a key phrase input by the user. Each segment is searched until all instances of the key phrase are detected. If the key phrase is detected, the segment is identified as containing it. The identified segments are subsequently presented to the user.

The invention affords the user an efficient cross-reference utility. In performing a cross-reference of a category of document, the user is first presented with documents contained in a specified category of document. Upon designating two or more documents for cross-reference on a given key phrase, the user is presented with side-by-side lists of segments within the document which contain the key phrase. Upon selecting two or more segments for further cross-reference on the key phrase, the user is presented with the contents of the segments with the key phrase appropriately distinguished for ease of identification. Thus, the user is able to cross-reference the discussion of a given topic associated with the key phrase in multiple documents in an efficient and hierarchical manner.

As an example, a very large specification, such as a one setting forth the engineering requirements for a certain type of battle tank, can be stored on the document server computer 104. The specification may contain thousands of pages and may additionally comprise a number of volumes. Furthermore, each volume can contain thousands of sections. Multiple authorized users may advantageously be permitted to draft, and/or later amend, diverse segments of the stored agreement that nonetheless relate to a common topic. In one embodiment, authorized users provide a password to the document server computer 104. If the password is authenticated, the user is permitted to draft or amend various segments of the specification stored on the document server computer 104.

During various phases of the preparation of the specification, it may become necessary to visually compare all of the segments of the specification that relate to, for example, the tank's cannon. This may be done in order to ensure that the contents of the segments do not contradict or to ensure that they are not redundant. This invention allows users to remotely access the stored specification and quickly and efficiently cross-reference all of the segments relating to the tank cannon without having to view the contents of the entire specification, or to select between views of the various documents/segments/volumes in a sequential or "back-and-forth" fashion.

For example, a user can request the document server computer 104 to perform a cross-reference of the specification segments. (The stored specification may advantageously be considered a category of document.) The user can be presented with the one or more volumes contained in the specification. The volumes may advantageously be considered the documents contained in the particular category of document. The document server computer 104 advantageously focuses the user to the volumes that actually contain references to the tank cannon.

In like fashion, the user can request a cross-reference of a specific volume and a specific segment contained in the specified volume. At each phase of the cross-reference, the user is presented with a segment list identifying the segments of the volume that refer to the tank cannon. The user can then specify one or more segments for the document server computer 104 to cross-reference. The contents of the requested segments are displayed and the references to the tank cannon are further distinguished for identification. Consequently, the user does not have to browse the thousands of pages contained in the specification to find each discussion of the tank cannon. Moreover, the user is able to focus the cross-reference to one of the multiple volumes, and one of the thousands of sections making up a volume, in observing, analyzing and comparing references to the cannon made in multiple volumes, documents, segments, etc.

Similar advantages may be obtained if a user needs to compare references to the tank cannon in the specification, to references to the tank cannon in an archive of Department of Defense e-mails, and/or to references to the tank cannon in an archive of Department of Defense press releases. The user first selects the specification, e-mail archive and press release archive for cross-reference on a key phrase corresponding to the tank cannon, such as "120 mm." The system of the present invention advantageously searches the specification, e-mail archive and press-release archive for the key phrase "120 mm" and presents a side-by-side display of lists of segment identifiers corresponding to the segments of each of the three documents containing instances of the key phrase "120 mm." A first window of this display contains a list of specification segment identifiers (such as titles of volumes of the specification) corresponding to specification segments that contain the key phrase. A second window of this display contains a list of segment identifiers from the e-mail archive (such as titles of electronic folders containing all of the emails for a given date or the "RE:" text from individual emails) corresponding to segments of the e-mail archive that contain the key phrase. A third window of this display (advantageously located furthest to the right on the screen) contains a list of segment identifiers from the press-release archive (such as titles of folders containing press releases from a particular office within the Department of Defense) corresponding to segments of the press-release archive that contain the key phrase.

Upon viewing this display, the user can select one or more segments from each window for further cross-reference. Advantageously, the present invention permits the user to save time by selecting only those segments which appear likely to contain relevant references to the tank cannon. In other words the user can exercise his or her judgment as to whether a particular segment that is found to contain one or more instances of the key phrase, is likely to contain information about the tank cannon that interests the user. For example, the user may see that certain segment identifiers in the first window (in our example, specification volume titles) represent specification volumes that are unlikely to contain information about the tank cannon that the user would be interested in, even though the volumes contain one or more instances of the key phrase. The user can thus focus on only the more relevant segments/volumes without wasting time on further investigation of the contents of the less relevant segments/volumes. Or, when reviewing the segment identifiers in the second window (in our example, the daily e-mail folders) the user may recognize that many of the e-mail folders are from dates too far in the past to be of any relevance. Thus the user saves time by selecting only the more recent, more relevant e-mail folders for further searching/cross-reference, and avoids further investigation of the older, less relevant folders. Likewise, when reviewing the segment identifiers in the third window, the user can select the press-release folders from the more relevant DoD offices and avoid the folders from the less relevant offices. In sum, the hierarchical cross-reference facilitated by the present invention permits the user to, at each level in the hierarchy, exercise judgment to steer the search toward the more relevant portions of a large document or data compilation, and avoid time-consuming sequential or "page-by-page" review of these documents. The side-by-side display permits quick and easy comparison of multiple documents at each level in the hierarchy.

Continuing the example, after the user selects a number of displayed segments for further cross-reference, the user is presented with another side-by-side display of lists of the subsections, etc. from each selected segment which contain instances of the key phrase. In the case of the specification, the user is presented with a list of chapters from the previously-selected volume which contain the key phrase. The lists of subsections are shown in a series of windows, one for each of the selected segments from the previous display, and the user is prompted to select one or more subsections for further cross-reference. As disclosed above, this process continues until the user reaches the lowest level of the hierarchy. At this point the user can easily compare instances of the key phrase in the specification, e-mail archive, and press-release archive, displayed in side-by-side windows. The user may then verify that the various discussions of the topic relating to the key phrase are consistent, identify where changes may be needed, or otherwise compare the treatment of the topic in diverse locations in multiple large documents.

It is contemplated that the present invention can be used to cross-reference many different types of documents. For example, a user may wish to cross-reference the tank specification with an audio file that contains a compilation of speeches made by the Secretary of Defense, and with a video file containing footage of tests of various Army vehicles and equipment. The user's purpose may be to compare the discussion of the tank cannon in the specification with the Secretary's statements about the cannon in his speeches, and/or with the characteristics and performance of the cannon that may be observed in the test footage. The user is prompted to enter a key phrase suitable for searching the text of the specification, such as "120 mm," and to identify a key phrase suitable for searching the audio file, such as an audio clip of the Secretary or someone else saying "120 millimeter" or the user's own voice (transmitted through a microphone attached to the user's computer) saying "120 millimeter." The user is also prompted to specify a key phrase suitable for searching the video file, such as a frame or series of frames depicting the cannon.

Upon entry of the key phrase(s) the user is presented a side-by-side display of lists of segment identifiers from each of the specification, audio file and video file corresponding to segments containing the appropriate key phrase. The segment identifiers may be, for example, the volume titles of the specification, the titles of individual speeches, and vehicle-test categories. As disclosed above, the present invention permits the user to search at each successive level in the hierarchy of each of the specification, audio file and video file, until actual instances of the key phrase in each of the files are selected and shown in side-by-side windows. In the case of an audio file, the window may advantageously contain a matrix of buttons that are used to play/pause/rewind an audio clip containing the key phrase, as well as a progress bar, timer, waveform display, etc. In the case of a video file, the window may advantageously contain an inset window through which the video is displayed, along with a set of buttons, progress bar, timer, etc. Thus the user in our example may read the text from the specification containing the key phrase "120 mm" in a first window, control the playback of an audio clip containing the Secretary's utterance of "120 millimeter" in a second window, and view a video clip of a test of the tank cannon in a third window, so as to quickly and easily compare information about the cannon from each of these three sources.

In one embodiment, the audio file is advantageously translated into text to facilitate searching. This could be done by a speech-to-text conversion program or by use of the actual speech copy received from the person who wrote the speech, or by a stenographer typing in the speech text as the person is speaking.

It has been found that the present invention is especially useful when the user needs to cross-reference large documents, for example documents of 50–100 pages or more, or when the user must cross-reference a large number (5 or more) of smaller documents which together total over 50–100 pages. (One example of a large document is the International Civil Aviation Organization's *Standards & Recommended Practices*, a multivolume document that includes over 1500 pages.) It has also been found that the present invention is particularly useful when it is necessary to achieve precise consistency or correctness of wording or meaning among a number of documents, regardless of their length. This is often true when dealing with legal documents or documents intended for wide dissemination among the public, such as advertising materials. Of course, those of ordinary skill in the art will realize that the present invention may also be beneficially used to rapidly and hierarchically cross-reference smaller or less numerous documents in a variety of situations.

An additional advantage of the present invention is the ability to search and cross-reference multiple documents that are of different types. As disclosed above, the system can cross-reference an archive of e-mails against a tank specification, an example of two documents that are of different types even though they are both text documents. In addition, the documents submitted for cross-reference may be a mix of text, audio, graphic, video and other types of documents.

This invention may be embodied in other specific forms without departing from the essential characteristics as described herein. The embodiments described above are to be considered in all respects as illustrative only and not restrictive in any manner. The scope of the invention is indicated by the following claims rather than the foregoing description.

What is claimed is:

1. A hierarchical document cross-referencing system comprising:
    a document server computer accessible by a user computer, said document server computer comprising:
        a database which stores the contents of a first document and a second document wherein said first document and said second document each includes one or more segments, each of said segments having segment content and a corresponding segment label wherein said segment label is shorter than said segment content; and
        a module executable in said document server computer wherein said module is configured to receive a request to search said first document and said second document for a key phrase composed and input by a user, said module searches said first document and said second document for said key phrase, said module identifying said segments containing said key phrase, said module displaying on said user computer a side-by-side display wherein said side-by-side display lists only the labels, and not the segment content, of said identified segments from said first document in a first list and lists only the labels, and not the segment content, of said identified segments from said second document in a second list.

2. The system of claim 1, wherein said module is further configured to receive a request to display on said user computer a side-by-side display of the segment content of one or more of said identified segments from said first document and the segment content of one or more of said identified segments from said second document.

3. The system of claim 1, wherein said first document comprises a document selected from the group consisting of text document, graphic document, audio document, video document and audiovisual document.

4. The system of claim 3, wherein said second document comprises a document selected from the group consisting of text document, graphic document, audio document, video document and audiovisual document.

5. The system of claim 1, wherein said first document and said second document together total at least 50 pages in length.

6. The system of claim 1, wherein at least one of said first document and said second document is at least 50 pages in length.

7. The system of claim 1, wherein said first document and said second document comprise different types of documents.

8. A system for cross-referencing electronic data, said system comprising:
    a server computer accessible by a user computer, said server computer comprising:
        a database which stores said electronic data in a first data set and a second data set, wherein said first data set and said second data set each include one or more divisions, each of said divisions having division content and a corresponding division label wherein said division label is shorter than said division content; and
        a module executable in said server computer wherein said module is configured to receive a request to search said first data set and said second data set for a key phrase composed and input by a user, said module searches said first data set and said second data set for said key phrase, said module identifies said one or more divisions that contain said key phrase, and said module displays only the labels, and not the division content, of said identified divisions in a side-by-side display in response to a request to search for said key phrase.

9. The system of claim 8, wherein said one or more divisions in said first or second data set are one or more document categories.

10. The system of claim 8, wherein said one or more divisions in said first or second data set are one or more documents.

11. The system of claim 8, wherein said one or more divisions in said first or second data set are one or more segments.

12. The system of claim 8, wherein said identified divisions in said first or second data set are distinguished in said side-by-side display.

13. A hierarchical document cross-referencing system comprising:
    a document server computer accessible over a communication medium, said document server computer comprising:
        a database which stores a first document and a second document, wherein said first document and said second document include a plurality of segments, each of said segments having segment content and being identified by segment identifiers; and
        a module executable in said document server computer wherein said module is configured to receive a request to search said first document and said second document for a search word or phrase composed and input by a user, said module searches said first document and said second document for said search word or phrase, and said module displays only said segment identifiers, and not said segment content, for said segments containing said search word or phrase in a displays; wherein said display comprises a first display adjacent to a second display.

14. The system of claim 13, wherein said module is further configured to receive a request to display said segment content of said segments containing said search word or phrase in a side-by-side display.

15. The system of claim 13, wherein said first document comprises a document selected from the group consisting of text document, graphic document, audio document, video document and audiovisual document.

16. The system of claim 15, wherein said second document comprises a document selected from the group consisting of text document, graphic document, audio document, video document and audiovisual document.

17. The system of claim 13, wherein said first document and said second document together total at least 50 pages in length.

18. The system of claim 13, wherein at least one of said first document and said second document is at least 50 pages in length.

19. The system of claim 13, wherein said first document and said second document comprise different types of documents.

20. A hierarchical cross-referencing system, comprising a module executable in a document server computer, wherein said module is configured to receive a request to search a first hierarchy and a second hierarchy for a search term composed and input by a user, each of said first hierarchy and said second hierarchy having one or more elements, each of said elements having element content and a corresponding element label wherein said element label is shorter than said element content, said module displaying said element labels, and not said element content, of one or more elements in said first and second hierarchies containing said search term in a side-by-side display in response to receiving said request to search said first and second hierarchies.

21. A computer-implemented method of cross-referencing first and second hierarchies wherein said first and said second hierarchies each include one or more elements, each of said elements having element content and a corresponding element label wherein said element label is shorter than said element content, said method comprising:
receiving a request to search said first and said second hierarchies for a search term composed and input by a user;
searching said first and said second hierarchies for said search term;
identifying which of said elements within said first and second hierarchies contain said search term; and
displaying said element labels, and not said element content, of said identified elements in a side-by-side display.

22. A computer-implemented of cross-referencing first and second hierarchies wherein said first and said second hierarchies each include one or more elements having element content and denominated by element labels wherein said element labels are shorter than said element content, said method comprising:
receiving a request to search said first and said second hierarchies for a search term composed and input by a user;
searching said first and said second hierarchies for said search term;
identifying which of said elements within said first and second hierarchies contain said search term;
displaying only said element labels, and not said element content, associated with said identified elements in a first side-by-side display;
receiving a request to display said identified elements; and
displaying said element content of said identified elements in a second side-by-side display.

23. A hierarchical document cross-referencing system comprising:
a document server computer accessible by a user computer, said document server computer comprising:
a database which stores the contents of a plurality of documents wherein each of said plurality of documents includes one or more segments, each of said segments having segment content and a corresponding segment label wherein said segment label is shorter than said segment content; and
a module executable in said document server computer wherein said module is configured to receive a request to search said plurality of documents for a key phrase composed and input by a user, said module searches said plurality of documents for said key phrase, said module identifying said segments containing said key phrase, said module displaying on said user computer a side-by-side display wherein said side-by-side display contains a plurality of side-by-side lists of said segment labels, and not said segment content, of said identified segments that correspond to each of said plurality of documents.

24. A hierarchical document cross-referencing system comprising:
a computer comprising a database which stores the contents of a first document and a second document wherein said first document and said second document each includes one or more segments, each of said segments having segment content and a corresponding segment label wherein said segment label is shorter than said segment content; and
a module executable in said computer, wherein said module is configured to:
receive a request to search said first document and said second document for a data string composed and input by a user;
search said first document and said second document for said data string;
identify said segments containing said data string;
display a first side-by-side display which lists said segment labels of said identified segments from said first document in a first list and lists segment labels of said identified segments from said second document in a second list;
receive a request to display said segment content of at least one of said identified segments from said first document and said segment content of at least one of said identified segments from said second document; and
display a second side-by-side display which lists at least some of said segment content of at least one of said identified segments from said first document and at least some of said segment content of at least one of said identified segments from said second document.

25. The system of claim 24, wherein said first document and said second document are not of the same document type.

26. The system of claim 24, wherein at least one of said first document and said second document comprises a document selected from the group consisting of text document, graphic document, audio document, video document and audiovisual document.

27. The system of claim 24, wherein at least one of said first document and said second document is at least 50 pages in length.

28. The system of claim 24, wherein said module is configured to display in said first side-by-side display only said segment labels, and not said segment content, of said identified segments from said first document in said first list, and to display only said segment labels, and not said segment content, of said identified segments from said second document in said second list.

29. The system of claim 24, wherein said data string is selected from the group consisting of a word, multiple words, a letter, a byte, a bit and a pixel.

30. The system of claim 24, wherein said data string is selected from the group consisting of a pattern, an image, a frame, a scene, a series of patterns, a series of images, a series of frames and a series of scenes.

* * * * *

UNITED STATES PATENT AND TRADEMARK OFFICE
CERTIFICATE OF CORRECTION

PATENT NO. : 6,978,420 B2
APPLICATION NO. : 09/781685
DATED : December 20, 2005
INVENTOR(S) : Philip Waisin Ching It is certified that error appears in the above-identified patent and that said Letters Patent is hereby corrected as shown below:

On the Title Pg. Item (56)
On Page 2, Line 3, delete "Internation" and insert -- International --, therefor.

In Column 19, Line 19, delete "reaccess" and insert -- re-access --, therefor.

In Column 23, Line 26, delete "e-mails" and insert -- emails --, therefor.

In Column 25, Line 7, Claim 13, delete "displays;" and insert -- display; --, therefor.

In Column 25, Line 59, Claim 22, after "implemented" insert -- method --.

Signed and Sealed this

Second Day of June, 2009

JOHN DOLL
*Acting Director of the United States Patent and Trademark Office*